(12) United States Patent
Chavez et al.

(10) Patent No.: US 12,743,105 B1
(45) Date of Patent: Sep. 22, 2026

(54) DEPLOYABLE AUTONOMOUS SERVICE VEHICLE

(71) Applicant: UIPCO, LLC, San Antonio, TX (US)

(72) Inventors: Carlos JP Chavez, San Antonio, TX (US); Gregory David Hansen, Fuquay Varina, NC (US); Bradly Jay Billman, Celina, TX (US); Kristina Suniga-Cabrera, College Park, MD (US); Dwayne Phillip Wilson, Crossroads, TX (US); Timothy Benjamin Czerlinsky, Dallas, TX (US); David Patrick Dixon, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 190 days.

(21) Appl. No.: 18/419,645

(22) Filed: Jan. 23, 2024

Related U.S. Application Data

(60) Provisional application No. 63/481,129, filed on Jan. 23, 2023.

(51) Int. Cl.

| | |
|---|---|
| ***G05D 1/69*** | (2024.01) |
| ***B60L 53/53*** | (2019.01) |
| ***B60W 60/00*** | (2020.01) |
| ***G05D 105/55*** | (2024.01) |
| ***G05D 107/10*** | (2024.01) |
| ***G08G 1/00*** | (2006.01) |

(52) U.S. Cl.
CPC ................ *G05D 1/69* (2024.01); *B60L 53/53* (2019.02); *B60W 60/001* (2020.02); *G08G 1/22* (2013.01); *B60L 2240/66* (2013.01); *G05D 2105/55* (2024.01); *G05D 2107/10* (2024.01)

(58) Field of Classification Search
CPC .. G05D 1/69; G05D 2105/55; G05D 2107/10; B60L 53/53; B60L 2240/66; B60W 60/001; G08G 1/22
See application file for complete search history.

(56) References Cited

U.S. PATENT DOCUMENTS

| | | | | |
|---|---|---|---|---|
| 2015/0019267 | A1* | 1/2015 | Prieto | G06Q 10/067 705/348 |
| 2017/0256013 | A1* | 9/2017 | Ghosh | G08G 1/202 |
| 2019/0137996 | A1* | 5/2019 | Zhang | G05D 1/0027 |
| 2021/0192405 | A1* | 6/2021 | Bristow | G05D 1/104 |
| 2021/0192629 | A1* | 6/2021 | Tofte | G06V 10/42 |
| 2022/0157178 | A1* | 5/2022 | Grace | G01C 21/3833 |

* cited by examiner

*Primary Examiner* — Navid Z. Mehdizadeh
*Assistant Examiner* — Shelley Marie Osterhout
(74) *Attorney, Agent, or Firm* — Plumsea Law Group, LLC

(57) ABSTRACT

A method of deploying a service, the method including: receiving data about a predicted event; determining a density of a population in a service area predicted to be affected by the predicted event; determining a targeted location within the service area using the data about the predicted event and the density of the population in the service area; and instructing an autonomous vehicle to dispatch to the targeted location.

20 Claims, 10 Drawing Sheets

300
301
302 PROCESSOR
303 CRM
304 RECEIVER
305 TRANSMITTER
306
307
308

400
401
402
403
404
405
406
407
408
409
410
411
412

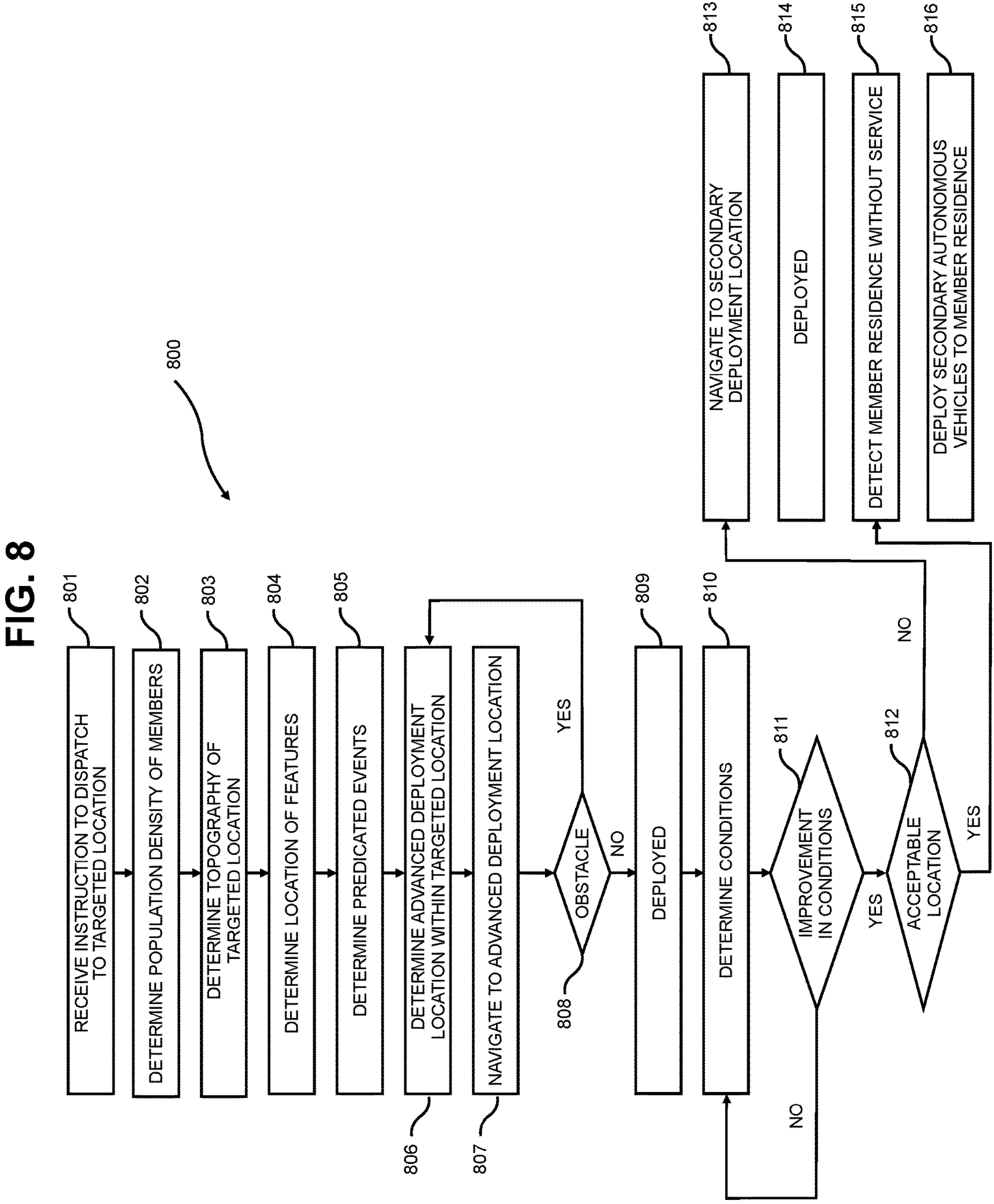
FIG. 8
800
801
RECEIVE INSTRUCTION TO DISPATCH TO TARGETED LOCATION
802
DETERMINE POPULATION DENSITY OF MEMBERS
803
DETERMINE TOPOGRAPHY OF TARGETED LOCATION
804
DETERMINE LOCATION OF FEATURES
805
DETERMINE PREDICATED EVENTS
806
DETERMINE ADVANCED DEPLOYMENT LOCATION WITHIN TARGETED LOCATION
807
NAVIGATE TO ADVANCED DEPLOYMENT LOCATION
808
OBSTACLE
YES
NO
809
DEPLOYED
810
DETERMINE CONDITIONS
811
IMPROVEMENT IN CONDITIONS
NO
YES
812
ACCEPTABLE LOCATION
NO
YES
813
NAVIGATE TO SECONDARY DEPLOYMENT LOCATION
814
DEPLOYED
815
DETECT MEMBER RESIDENCE WITHOUT SERVICE
816
DEPLOY SECONDARY AUTONOMOUS VEHICLES TO MEMBER RESIDENCE 1001
1002
1003
1004
1005
1006
1007
1008
1009

DEPLOYABLE AUTONOMOUS SERVICE VEHICLE

CROSS-REFERENCE TO RELATED APPLICATION

This application claims the benefit of U.S. Provisional Patent Application Ser. No. 63/481,129 filed on Jan. 23, 2023 and titled "Deployable Autonomous Service Vehicle", the disclosure of which is incorporated by reference herein in its entirety.

TECHNICAL FIELD

The present disclosure relates to a deployable autonomous vehicle, and more particularly a deployable autonomous vehicle providing services.

BACKGROUND

In a case of a catastrophe, services may be severely limited or unavailable, while it may be impossible, difficult, or otherwise inconvenient for a client, customer, or member to travel to a location of a service provider. Similarly, travel to an affected area may be difficult or impossible for a period following a catastrophic event.

There is a need in the art for a system and method that addresses the shortcomings discussed above.

SUMMARY

In one embodiment, the disclosure provides a method of deploying a service, the method including: receiving data about a predicted event; determining a density of a population in a service area predicted to be affected by the predicted event; determining a targeted location within the service area using the data about the predicted event and the density of the population in the service area; and instructing an autonomous vehicle to dispatch to the targeted location.

In one embodiment, the disclosure provides a method of deploying a service, the method comprising: receiving, by an autonomous vehicle, an instruction to dispatch to a target location; determining a targeted location using location information of a plurality of members; determining an advanced deployment location within the targeted location; navigating, by the autonomous vehicle, to the advanced deployment location; determining a condition at the advanced deployment location; detecting a member residence without service; and deploying, by the autonomous vehicle, a secondary autonomous vehicle to the member residence to render the service upon determining that the condition satisfies a threshold and that the member residence is without the service.

In another embodiment, the disclosure provides an autonomous fleet system comprising: a fleet management controller; a secondary autonomous vehicle configured to provide a service; and an autonomous vehicle comprising: a processor; and a memory storing instructions that, when executed by the processor, cause the autonomous vehicle to: receive instructions from the fleet management controller, the instructions including a targeted location associated with a predicted event; deploy to the targeted location; determine conditions at the targeted location; and deploy the secondary autonomous vehicle to a residence within the targeted location based on the conditions.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

FIG. 3 is a schematic illustration of a vehicle fleet dispatch system and process, in an embodiment.

FIG. 8 is a flowchart illustrating a vehicle fleet dispatch process, in an embodiment.

DETAILED DESCRIPTION

Embodiments are directed to an advanced deployment of emergency services. According to one embodiment, a fleet of autonomous vehicles may be dispatched to targeted locations in advance of a predicted event, avoiding possible road closures and other obstacles. According to some embodiments, one or more of the autonomous vehicles may be an outpost for secondary autonomous vehicles that may be deployed following the predicted event to persons or members within the targeted locations to provide services including power and communication services. Accordingly, emergency services may be pre-placed to service the targeted locations. The pre-placement of autonomous vehicles may enable improved quality-of-service for power and/or communication services, where outages may be detected and ameliorated by pre-placed equipment, thereby reducing service downtimes, for example.

In some cases, an autonomous vehicle deployed to a targeted location senses its environment and navigates without human input. The autonomous vehicle may use a variety of systems (e.g., a navigation package) to detect and navigate through the environment to the targeted location. These systems may include radar, Light Detection And Ranging (i.e., LiDAR), laser light, Global Positioning System (GPS), odometry, and computer vision. Control systems interpret sensory information to identify appropriate navigation paths, obstacles, and relevant signage. The autonomous vehicle may include a control system capable of analyzing sensory data to distinguish between different vehicles on the road.

According to one or more embodiment, the autonomous vehicle may use Simultaneous Localization And Mapping (SLAM) algorithms, which combine data from multiple sensors and available map data into current location estimates and map updates. The autonomous vehicles may include additional systems that may use roadside real-time locating system (RTLS) beacon systems to aid localization. Typical sensors include LiDAR and stereo vision, GPS, and Inertial Measuring Units (IMU). It should be understood that visual object recognition typically uses machine vision including neural networks.

Figure 1:
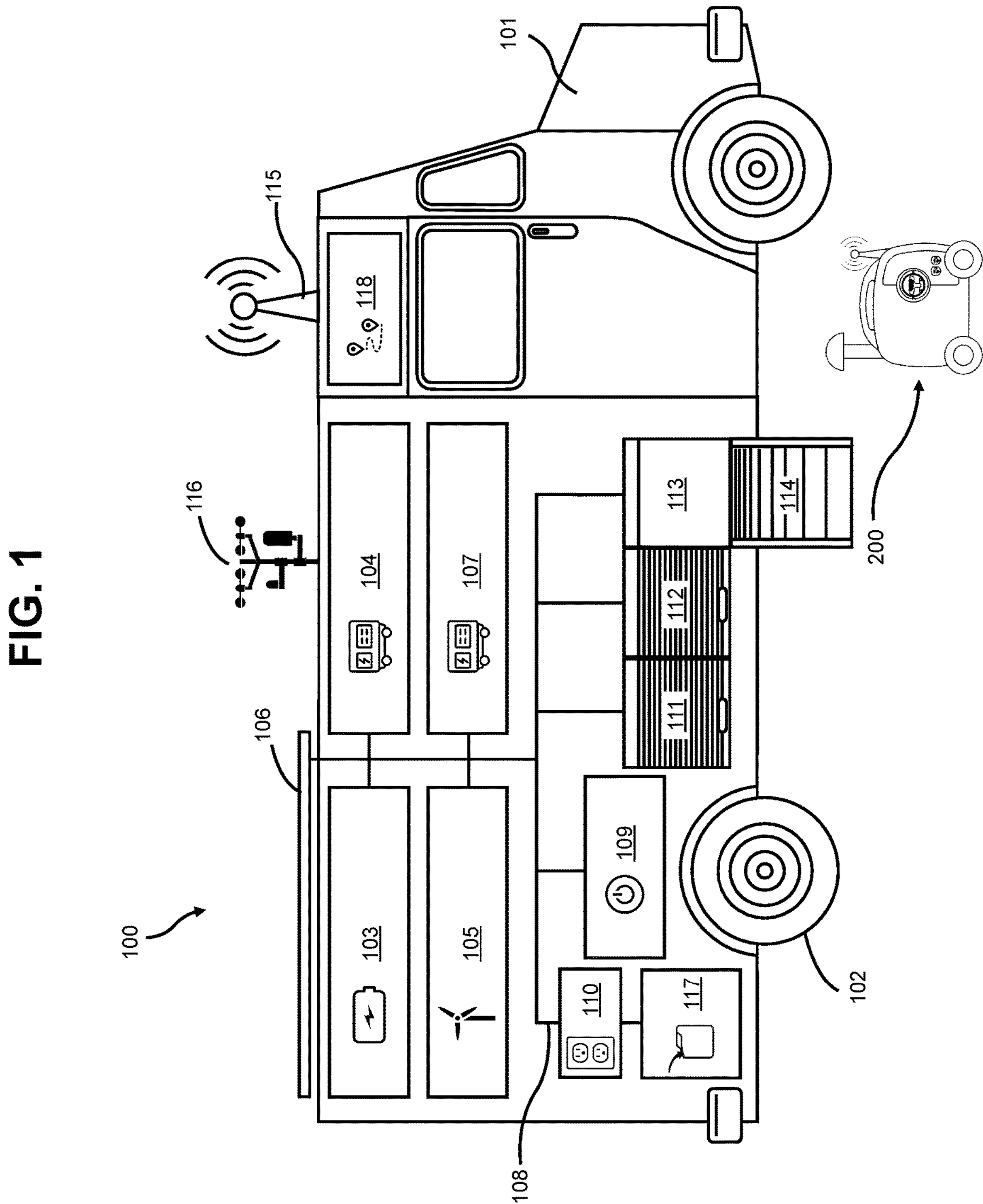
FIG. 1 is a schematic illustration of an example autonomous vehicle, in an embodiment.

Implementations of the present disclosure are generally directed to an autonomous vehicle 100 (see FIG. 1) that may deploy to a targeted location with equipment for providing a service. According to some embodiments, the autonomous vehicle 100 may arrive at the targeted location and alert persons (e.g., members) in an area to its presence. According one or more embodiments, the targeted location may be automatically selected based on one or more of population density of members, weather forecasts (e.g., predicted storm paths, predicted wildfire paths, wildfire warning levels for a given area, etc.), available infrastructure (e.g., roadway junctions), etc.

The autonomous vehicle 100 comprises a drive system 101. The drive system 101 may include one or more of an engine and an electric motor for travel. According to one example, the drive system 101 comprises a transmission delivering power to drive wheels 102 or tracks. The drive system 101 may be powered by one or more of, fuel and electric power. The fuel may be gas, diesel, hydrogen, etc. stored in an appropriate fuel tank 117. The electric power may be stored in a battery 103 and/or generated on the fly by a power generator 104. According to at least one embodiment, the electric power may be generated on-board the autonomous vehicle 100 by a wind powered generator 105, solar powered generator 106, secondary power generators 107 (such as a regenerative power motor), etc. According to some embodiments, the autonomous vehicle 100 includes a power bus 108 and a power controller 109 controlling the distribution of power between power generators and power consumers.

The battery 103 of the autonomous vehicle 100 may comprise one or more on-board battery banks. According to at least one embodiment, the autonomous vehicle includes the secondary power generator 107, which may charge the battery 103 and/or provide power directly to one or more outlets 110 installed on an exterior of the autonomous vehicle 100. According to one embodiment, the power controller 109 may be a power management system, which may facilitate the charging and discharging (e.g., under load) the battery 103. The autonomous vehicle 100 may be is a power source for members to recharge or power devices at or near the targeted location. For example, the secondary power generator 107 may be used to power appliances in one or more residences at the or near the targeted location via power cords connected to the outlet 110.

According to one embodiment, the autonomous vehicle 100 may comprise a communications package 115. The communications package 115 may include an antenna (e.g., for satellite, cellular, Wi-Fi connections) and appropriate electronics for communicating by one or more protocols. In some cases, the communications package 115 may be deployed as a micro-cellular site for providing communications services to members. In at least one example, an alert may be communicated to members using the communications package 115. An alert may be communicated by SMS, email, automated telephone calls, and include location data for the autonomous vehicle, estimated time of arrive, provided services, etc.

According to one embodiment, the autonomous vehicle 100 may comprise a weather station system 116. The weather station system 116 may include, for example, a thermometer, an anemometer, a wind vane, a hygrometer, a barometer, a rain gauge, telemetry equipment to communicate recorded data, etc.

The autonomous vehicle 100 may comprise a navigation package 118. The navigation package 118 may include radar, LiDAR, GPS systems, etc. The autonomous vehicle 100 may comprise a control system (see also FIG. 4, control system 411) to interpret sensory information and identify appropriate navigation paths, obstacles, and relevant signage. The control system may be configured to analyze sensory data to distinguish between different vehicles on the road, plan a path to a targeted location, etc.

According to some embodiments, the autonomous vehicle 100 may include one or more garages 111, 112, 113, which house one or more secondary autonomous vehicles. A secondary autonomous vehicle may deploy from the autonomous vehicle 100 using a ramp 114, a deployment arm, etc.

Figure 2:
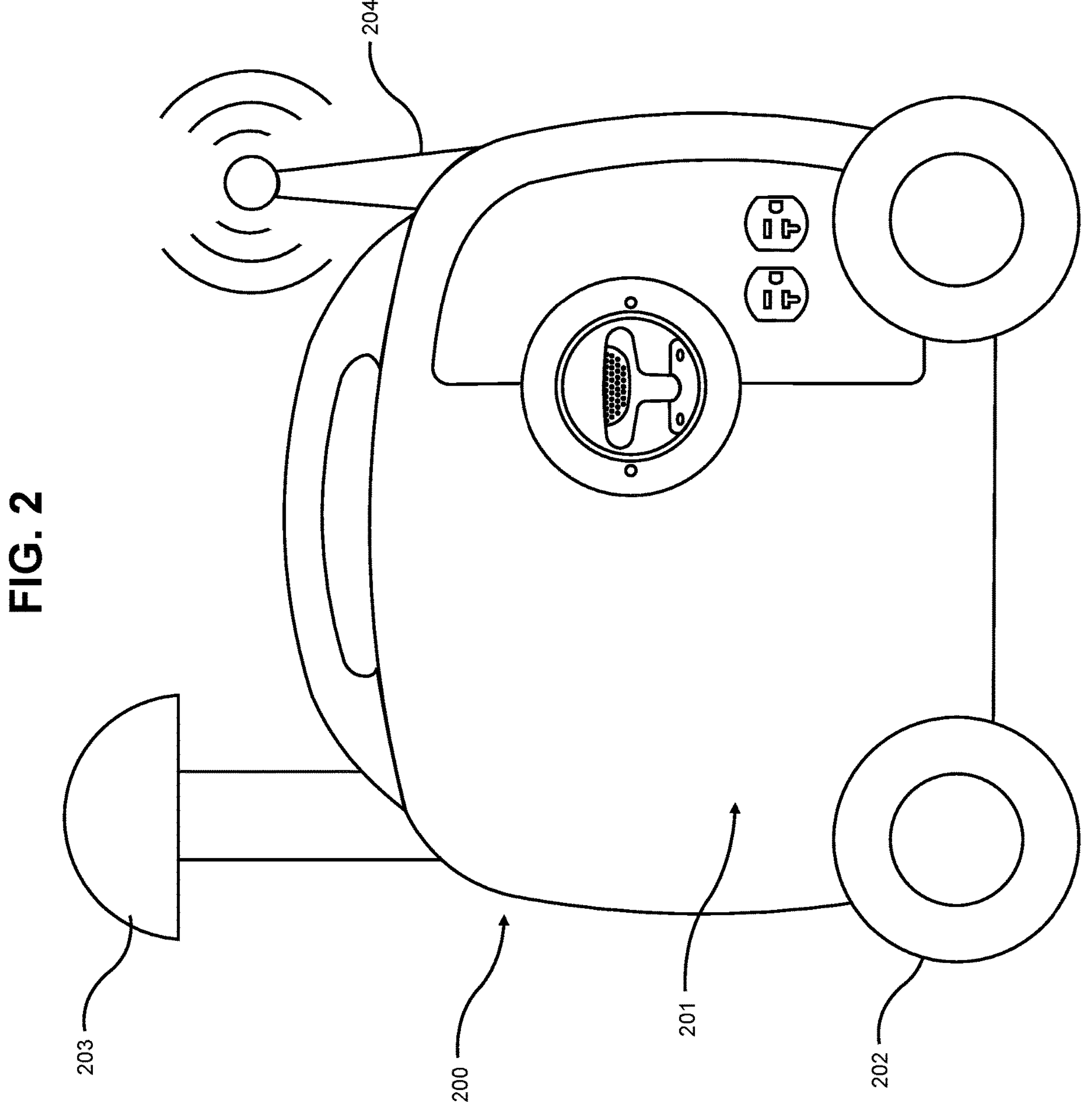
FIG. 2 is a schematic illustration of an example secondary autonomous vehicle, in an embodiment.

According to at least one embodiment and referring to FIG. 2, a secondary autonomous vehicle 200 may comprise a power supply 201, a drive system 202, a navigation package 203, and a secondary communications package 204. The power supply 201 may be a battery, a gas-powered generator, etc. The drive system 202 may include an engine or motor driving wheels or tracks, facilitating travel of the secondary autonomous vehicle 200.

According to one or more embodiments, the secondary autonomous vehicle 200 may use the navigation package 203 to travel between the autonomous vehicle 100 and a residence or living space of a member. The navigation package 203 may include radar, light detection and ranging (i.e., LiDAR), laser light, Global Positioning System (GPS), odometry, and computer vision systems. Control systems of the navigation package 203 may interpret sensory information to identify appropriate navigation paths, obstacles, and relevant signage.

The secondary autonomous vehicle 200 may communicate with the autonomous vehicle 100 using the secondary communications package 204. The secondary communications package 204 may include appropriate electronics (e.g., wireless adaptor, transmitter, receiver, antennas, etc.). According to one embodiment, the secondary autonomous vehicle 200 may deploy from the autonomous vehicle 100 to a residence or living space with an on-board battery bank for supplying power. The secondary autonomous vehicle 200 may monitor the power supply 201 (e.g., an electric charge or a fuel level) and return to the autonomous vehicle 100 upon detecting a low-level charge/fuel threshold of the power supply 201. In some examples, the secondary autonomous vehicle 200 may re-supply, recharge or refuel its power supply 201 or exchange its power supply 201 with another available from the autonomous vehicle 100 before redeploying around the targeted location.

According one or more embodiments, the targeted location may have a size determined by a geographic range of the secondary autonomous vehicles around the autonomous vehicle, which would allow for the return of the secondary autonomous vehicles. For example, a secondary autonomous vehicle may reserve about 150-200% of a charge used to reach a member residence from the autonomous vehicle, in order that the secondary autonomous vehicle may return to the autonomous vehicle. The targeted location may have a size determined by a geographic range of the secondary autonomous vehicles and a threshold for a number (or percentage) of members that may be served over time. For example, the threshold number of members may be 2-4 times the number of secondary autonomous vehicles, which may be dispatched to different member residences in a round-robin fashion. The secondary autonomous vehicles may be instructed by the autonomous vehicle to dispatch to different member residences over time, for example, to ensure some level of power and connectivity is provided to a group of members. According to one embodiments, the secondary autonomous vehicles may be instructed by the autonomous vehicle to dispatch to set of member residences in order, before returning to the autonomous vehicle, conditioned by a threshold power reserve (e.g., either fuel or charge) needed to return to the autonomous vehicle.

Figure 3:
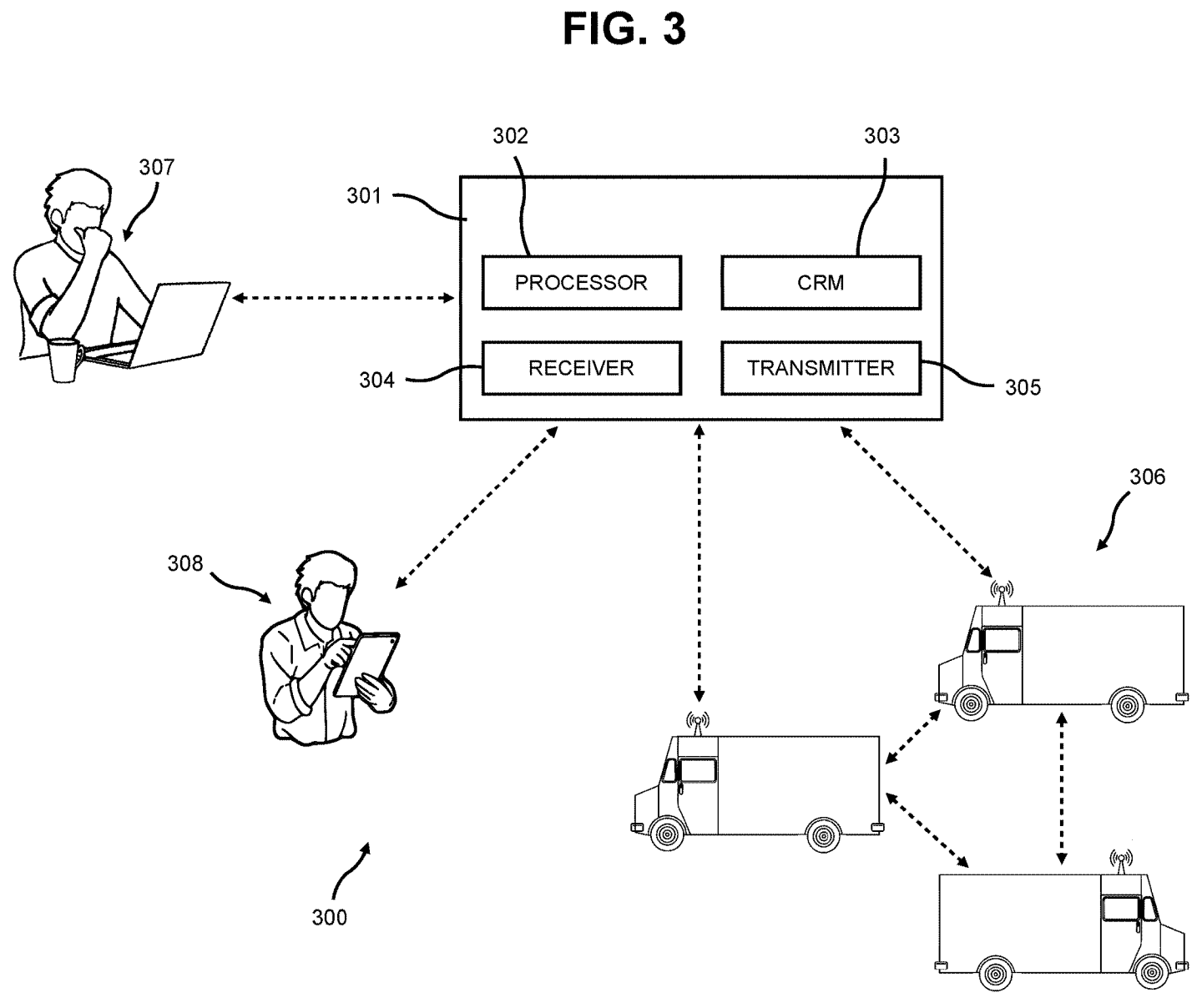

FIG. 3 is a schematic illustration of an autonomous vehicle fleet dispatch system and process. As shown in FIG. 3, a vehicle dispatch system 300 may include a fleet management controller 301. The fleet management controller 301 may include various computing and communications hardware. For example, as shown in FIG. 3, the fleet management controller 301 may include a device processor 302 and a non-transitory computer readable medium 303 including instructions executable by the device processor 302. Computer readable medium 303 may include any suitable computer readable medium, such as a memory, such as RAM, ROM, flash memory, or any other type of memory known in the art. The fleet management controller 301 may include other computing hardware, such as servers, integrated circuits, displays, etc.

Further, the fleet management controller 301 may include networking hardware configured to interface with other nodes of a network, such as a LAN, WLAN, or other networks. For example, as shown in FIG. 3, the fleet management controller 301 may include a receiver 304 and a transmitter 305. (It will be appreciated that, in some embodiments, the receiver and transmitter may be combined in a transceiver.) Receiver 304 and transmitter 305 may be configured to provide communication with other nodes of the vehicle dispatch system 300. For example, receiver 304 and transmitter 305 may be configured to communicate with the autonomous vehicles of a fleet 306. Such communication may be executed via any suitable format, such as satellite communication, radiofrequency signals, etc.

The fleet management controller 301 may be provided at any suitable location. In some cases, the fleet management controller 301 may be provided at a headquarters of a service provider. In other cases, the fleet management controller 301 may be provided at a dedicated dispatch facility configured to coordinate the fleet management processes.

Computer readable medium 303 of the fleet management controller 301 may include instructions for receiving a user request for one or more services. For example, as shown in FIG. 3, the fleet management controller 301 may be configured to receive requests from members accessing the vehicle dispatch system 300 via various access tools. For example, a first member 307 is shown accessing the vehicle dispatch system 300 via the Internet, e.g., with a laptop. A second member 308 is shown accessing the vehicle dispatch system 300 via an application (app) on a personal electronic device, such as a telephone. These members may submit requests for services, current locations, etc., using these access tools.

Computer readable medium 303 of fleet management controller 301 may further include instructions for dispatching an autonomous vehicle configured to provide one or more services to a targeted location. Further, computer readable medium 303 may include instructions to dispatch a fleet of autonomous vehicles in response to a plurality of member requests, where the device processor 302 determines the targeted location according to a density of members in a service area. For example, fleet 306 may include a plurality of autonomous vehicles and the computer readable medium 303 may include instructions executed by the device processor 302 to service a number of members (e.g., a maximum number of members) by dividing the service area into target locations to be served by the autonomous vehicles of the fleet 306.

In some embodiments, the autonomous vehicles of fleet 306 may communicate with each other. In some cases, the range from which the fleet management controller 301 may reach an autonomous vehicle may be extended by using a closer, or otherwise more accessible, autonomous vehicle as a relay. In other cases, autonomous vehicles may utilize artificial intelligence and/or machine learning to adjust dispatch protocols and instructions. This may improve efficiency and/or response time. For example, upon receiving instructions, a first autonomous vehicle may evaluate whether it has enough fuel to complete a trip to a targeted location. If not, the autonomous vehicle may pass along the instruction to another autonomous vehicle in the field. In some cases, the autonomous vehicles may broadcast a single signal that may be received by all autonomous vehicles in the fleet 306, and a suitable autonomous vehicle may accept the instructions passed along by the first autonomous vehicle. In other cases, the first autonomous vehicle may identify the autonomous vehicle that is closest to itself, the designated targeted location, and/or the autonomous vehicle that otherwise best suited to make the trip to the targeted location. The first autonomous vehicle may send a signal only to the identified autonomous vehicle, passing along the service instructions. Communication between autonomous vehicles of the fleet 306 significantly broadens the capabilities of the fleet 306 as a whole and provides flexibility and efficiency in terms of the collective ability of the fleet 306 to provide service to many members.

Figure 4:
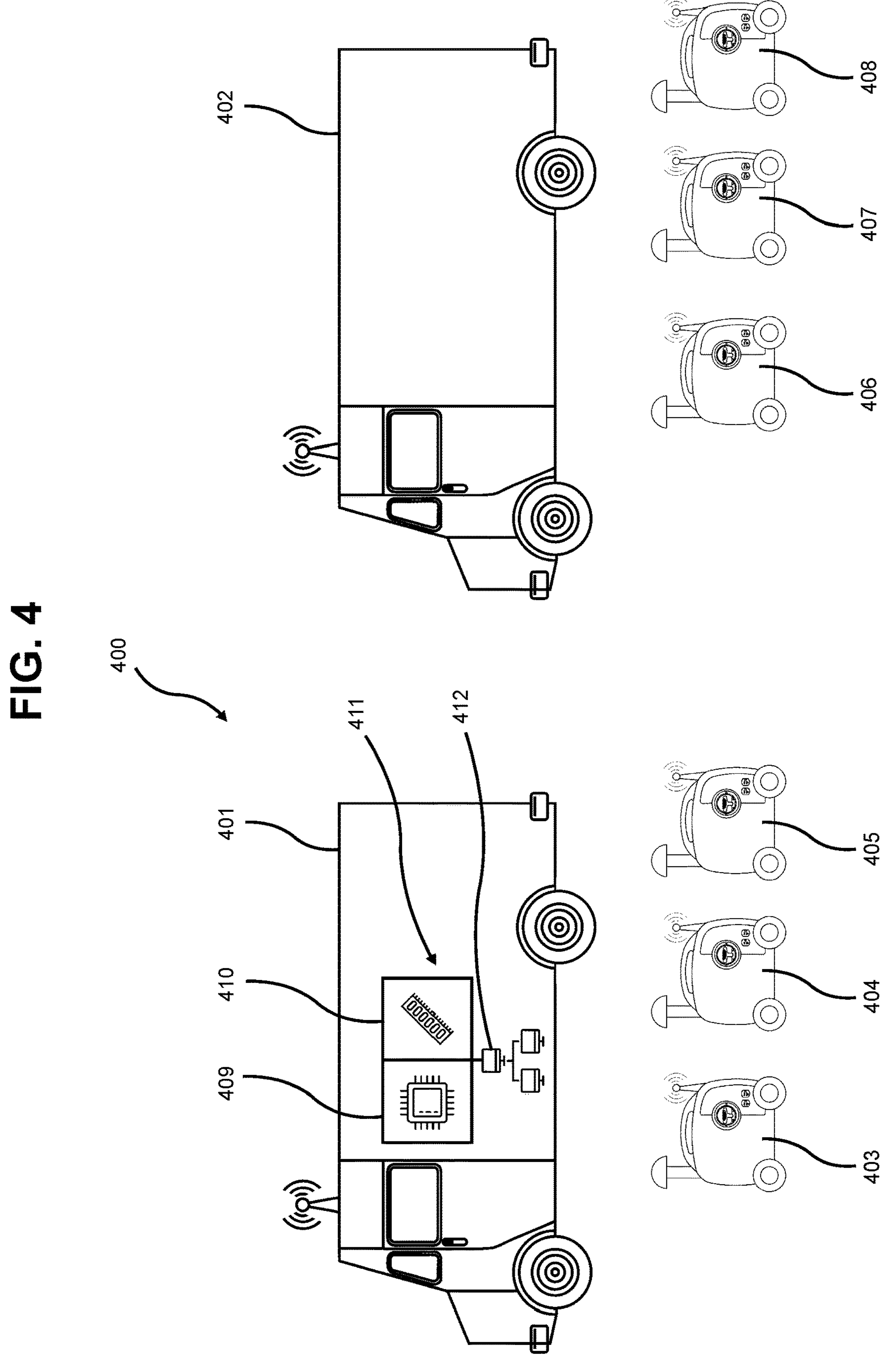
FIG. 4 is a schematic illustration of a fleet of vehicles configured for providing services, in an embodiment.

FIG. 4 is a schematic illustration of a fleet 400 of vehicles configured for providing services. For example, FIG. 4 illustrates a plurality of autonomous vehicles 401, 402, each having a plurality of secondary autonomous vehicles 403, 404, 405, and 406, 407, 408. Exemplary features of these and other types of service vehicles are discussed in greater detail below.

In some embodiments, one or more of these vehicles may be autonomous. That is, one or more of these vehicles may be configured to drive itself, unpiloted, to a location according to received instructions. The received instructions may include GPS data, waypoints, map coordinates, street addresses and the like. Accordingly, in some embodiments, each vehicle of the fleet includes a device processor 409 and a memory 410 including instructions executable by the device processor. For example, the computer readable medium on each vehicle may include instructions for receiving and executing dispatch instructions by autonomously driving to a location designated by a user or determined according to sensor data (e.g., weather forecasts, route data, accident data, etc.). Further, the computer readable medium on each vehicle may include instructions for providing the one or more services to the user at the designated location. According to one embodiment, the device processor 409 and memory 410 (e.g., a non-transitory computer readable medium) may be a control system 411 connected to the power controller 109, the communications package 115, a weather station system 116, a navigation package 118, etc. by a communications bus 412.

Figure 5:
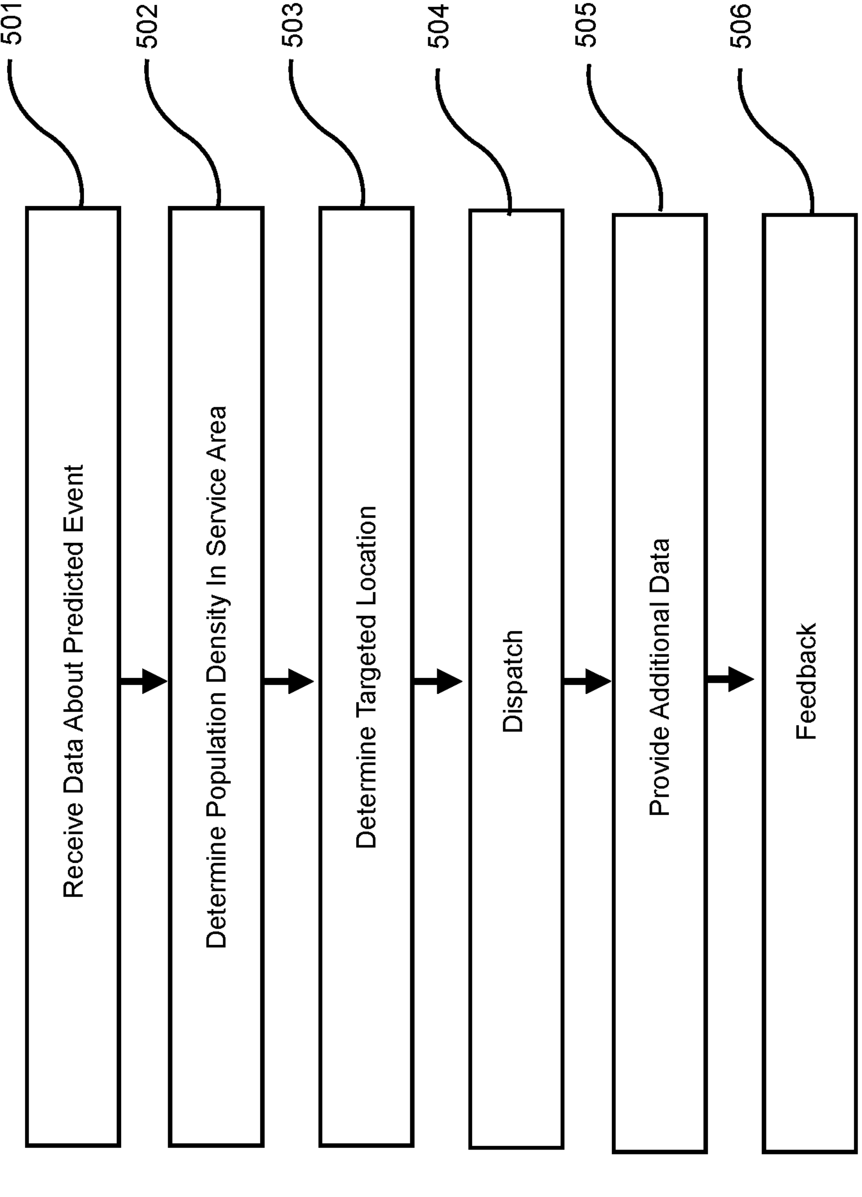
FIG. 5 is a flowchart illustrating a vehicle fleet dispatch process, in an embodiment.

FIG. 5 is a flowchart illustrating an autonomous vehicle fleet dispatch process 500 for the advanced deployment of the fleet. As shown in FIG. 5, data about a predicted event may be received (step 501), and a density of a population in a service area predicted to be affected by the predicted event may be determined (step 502). According to some aspects, a targeted location within the service area is determined using the data about the predicted event and the density of the population in the service area (step 503). In some examples, a dispatch protocol (step 504) may be used to determine how the autonomous vehicles of the fleet are to be dispatched to targeted locations. This dispatch protocol may be determined by a service provider.

The autonomous vehicle fleet dispatch process 500 may include providing additional data (step 505), such as providing the autonomous vehicle with a topography of at least a portion of the targeted location, providing the autonomous vehicle with location data about a feature within the targeted location, or providing the autonomous vehicle with contact information for a device in a member premises and an address of the member premises, wherein the population is a population of members.

The dispatch protocol may be used to determine the targeted locations to which the autonomous vehicles are dispatched. The dispatch protocol is the set of rules that are used to determine how, when, and where autonomous vehicles of the fleet are to be dispatched, based on the information available from various sources, including weather data (e.g., predicted landfall of a hurricane or predicted area of a storm, such as an ice storm, tornado, etc.) and traffic data, road closures, etc.). According to some embodiments, an autonomous vehicle is provided a targeted location by the autonomous vehicle fleet dispatch process 500 and the autonomous vehicle determines a path to the targeted location and an advanced deployment location within the targeted location to await the predicted event.

As shown in FIG. 5, the computer readable medium of the system may include instructions for recording and receiving data regarding operation of the vehicle (step 506) and factoring the recorded feedback data into the dispatch of the fleet, for example, in determining to dispatch additional resources (e.g., additional autonomous vehicles, crewed support vehicles, rescue vehicles, etc.). Recorded feedback data may include any number of pieces of information regarding the dispatch of the autonomous vehicle (e.g., trip distance, average speed, terrain of the route, and/or local rules and regulations restricting vehicular travel, etc.), the service provided.

Further, the computer readable medium of the system may include instructions for considering weather data, such as a predicted storm path, tides, predicted floods, regional information (e.g., population in the region, the number of members of the service provider in the region, the number of members temporarily out of the area (e.g., military deployment, away at college, etc.), etc. The computer readable medium of the system may further include instructions for using the recorded data, weather data, and additional data to determine a dispatch scheme of the fleet.

Figure 6:
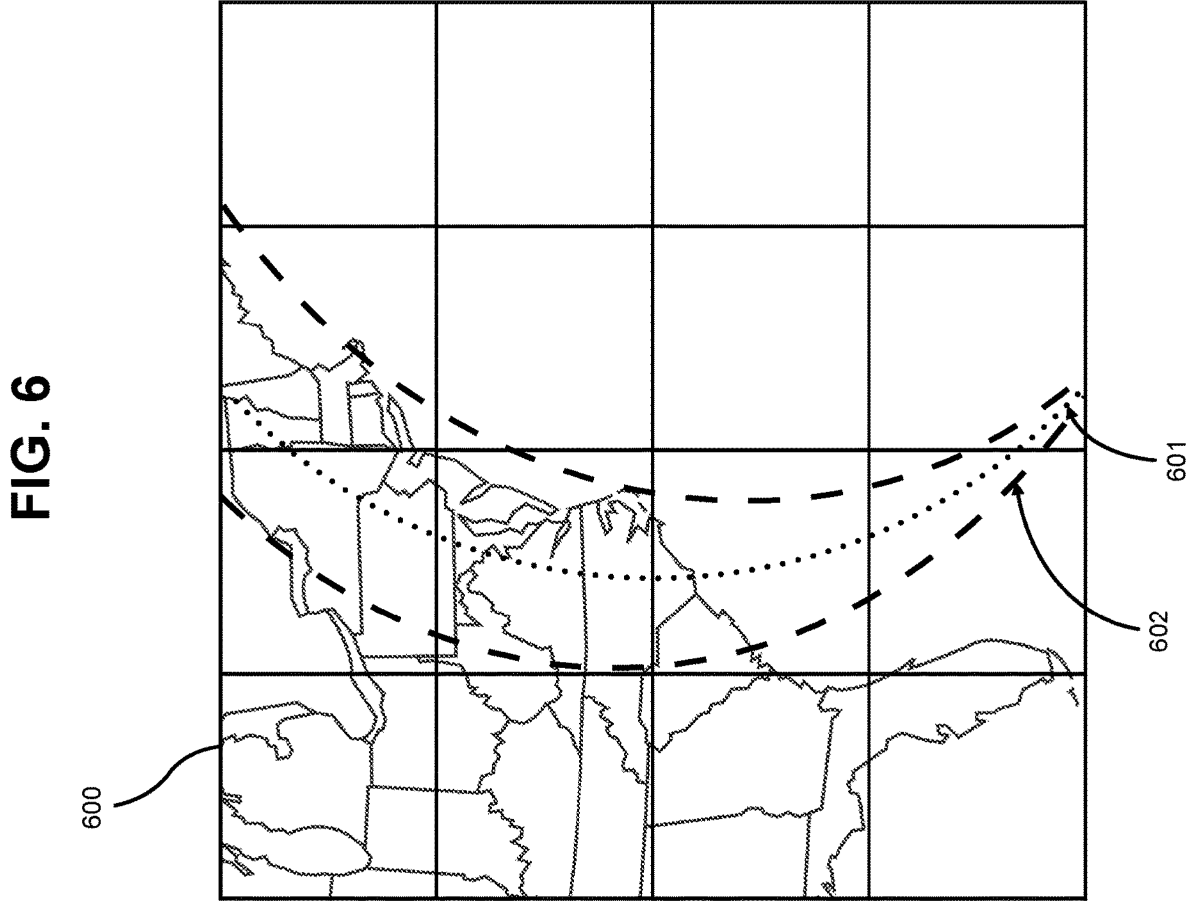
FIG. 6 is a schematic illustration of a predicted affected area, in an embodiment.

The autonomous vehicles may be strategically placed for convenient access by members in likely scenarios for the given targeted location. For example, as illustrated in the map 600 of FIG. 6, given a predicted storm path 601 and a cone of a probable track 602, one or more autonomous vehicles may be dispatched to target locations near the predicted storm path 601 and or the cone of the probable track 602. Herein, the service area may include an entire area served by, or to be served by, a company, such as an insurance company, a power company, a disaster recovery company, etc. A service area may include discontinuous areas.

Figure 7:
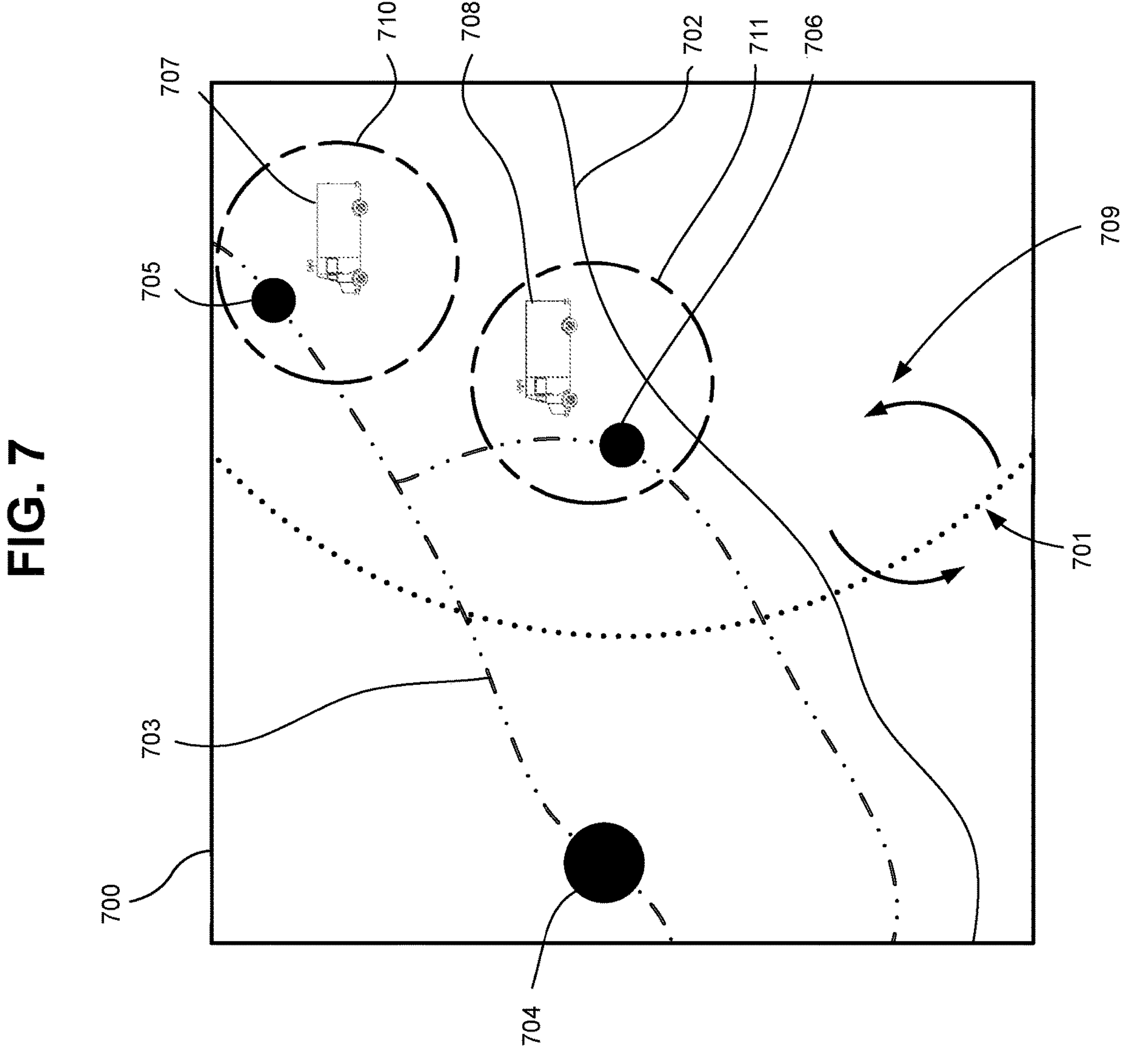
FIG. 7 is a schematic illustration of a predicted affected area including targeted locations, in an embodiment.

FIG. 7 is a schematic illustration of a local map 700 and a local predicted storm path 701. The local map 700 includes features. These features may include, for example, geologic features, such as a coastline 702, infrastructure, such as roadways 703 or parking structures, and population centers, such as first city 704, first town 705, and second town 706. Autonomous vehicles, including a first autonomous vehicle 707 and a second autonomous vehicle 708 may be deployed to a first targeted location 710 and a second targeted location 711, respectively, prior to a predicted arrival of the storm. According to some examples, the computer readable medium of the system may include instructions for deploying the autonomous vehicles to targeted locations on a windward side 709 of the storm, where predicted damage may be greater than a leeward side of the storm. The computer readable medium of the system may include instructions for deploying the autonomous vehicles to targeted locations upwind of a wildfire. As described herein, the computer readable medium of the system may include instructions for deploying the autonomous vehicles to parking structures designated in electronic map data within targeted locations, deploying outside of flood zones within targeted locations, etc. The autonomous vehicles may determine a path to the targeted location and an advanced deployment location within the targeted location to await the predicted event.

The disclosed autonomous fleet management concepts may apply to a wide variety of services that could be provided by vehicles. In some embodiments, one or more vehicles of the fleet may be configured with equipment for providing power as a service and internet connectivity. The following is a discussion of some exemplary equipment and associated services that may be provided by vehicles of the disclosed fleet. These are intended to be exemplary only. Other configurations and combinations of equipment are also possible.

According to at least one embodiment, the autonomous vehicle and/or the secondary autonomous vehicle include means for identifying devices via Power-Line Communications (PLC). For example, the autonomous vehicle and/or the secondary autonomous vehicle may be configured to deliver power upon identifying a connected device as an authorized device. An authorized device may be a refrigeration unit, a light emitting diode array, emergency equipment, etc. Examples of unauthorized devices may be devices with high load requirements, such as air conditioners or heating equipment in a case that the ambient is within a ranged-threshold (e.g., between about 45-90 degrees Fahrenheit), or with batteries with capacities larger than a threshold capacity, such that the secondary autonomous vehicle can manage usage of the on-board battery. According to some embodiments, the delivery of power to any one device may be limited to a threshold capacity or rate of charge.

The communications package 115 of the autonomous vehicle may comprise a satellite link dish and a wireless router for distributing a Wi-Fi signal in the targeted location. According to at least open embodiment, the Wi-Fi signal may deliver connectivity to the internet/web in general or to limited resources, such as a service provider's portal for disaster recovery. The autonomous vehicle may function as Wi-Fi hotspot and/or a micro-cellular site for local devices by networking with a mobile 4G/5G transmission vans that may be equipped with a mobile cell tower.

According to some embodiments, the autonomous vehicle may comprise an automated teller machine (ATM), a member service representative video center, a display for broadcasting news updates, weather channel updates, and updates on recovery efforts in or near the targeted location.

The autonomous vehicle and/or the secondary autonomous vehicle may comprise All-Terrain Vehicle (ATV) capabilities. For example, the autonomous vehicle and/or the secondary autonomous vehicle may be tracked vehicles (as compared to wheeled vehicles), facilitating travel over uneven terrain that can be common following catastrophes. According to one embodiment, the secondary autonomous vehicle is a flight-capable drone, enabled to deploy services to members by air. For example, upon detecting an outage of a communications link to a member residence, a flight-capable drone may deploy to the member residence, navigating by GPS, landing near a front door of the member residence, and providing a communications package for use by the member. The secondary autonomous vehicle may authenticate a member's credentials prior to providing the service, e.g., enabling power delivery or the communications package.

According to one embodiment and referring to FIG. 8, a method of deploying a service to a member 800 includes receiving, by an autonomous vehicle, an instruction to dispatch to a target location (step 801), determining location information, such as population density information for members, a specific address of a member, or an assigned area in a map-grid, (step 802), determining topographic information (e.g., including road maps, topographic maps, etc.) for the targeted location (step 803), determining locations of relevant features, such as parking structures (step 804), and determining predicted conditions, such as flooding, wind, etc., of an event, such as a storm, tsunami, earthquake, etc. (step 805). Herein, "determining" may include receiving, calculating, or retrieving unless specifically noted. The method may further include determining an advanced deployment location within the targeted location (step 806). The advanced deployment refers to a deployment prior to a predicted event. The method may further include the autonomous vehicle navigating to the advanced deployment location (step 807).

During the navigation, in a case where the autonomous vehicle encounters an obstacle (step 808), the autonomous vehicle may re-determine the advanced deployment location within the targeted location (step 806) and navigate to an updated advanced deployment location. Upon reaching the advanced deployment location, the autonomous vehicle is deployed (step 809). The autonomous vehicle may collect data about the event (step 810) to determine when conditions have improved (step 811). The autonomous vehicle may determine whether the deployment location is acceptable or suitable (step 812). In a case where the location is not acceptable, the autonomous vehicle may navigate to a secondary location (step 813), and upon reaching the secondary deployment location, the autonomous vehicle is deployed (step 814). The autonomous vehicle may further collect data to detect member residences without service (step 815). Upon detecting that the conditions have improved and that a member residence is without service (e.g., power or communications), a secondary autonomous vehicle may be deployed from the autonomous vehicle to the member residence (step 816) to render a service.

According to some embodiments, the determination of location information (step 802) may include the determination of member population density, for example, calculated as a number of members divided by a land area, which may be performed multiple times and at different granularities. For example, a population density of members for a given unit (e.g., per square mile) within a wide area (e.g., a country, city, or 100-mile area) may be used to determine different targeted locations within the wide area (e.g., areas with relatively high population densities). In another example, the location information may be a specific address assigned by the fleet management controller 301. In yet another example, the location information may be an area within a map-grid assigned by the fleet management controller 301. This determination may be performed by, for example, the autonomous vehicle fleet dispatch process 500 and the fleet management controller 301. According to one or more embodiments, each autonomous vehicle may be configured to use a population density of members for different areas within its assigned targeted location, either determined by the fleet management controller 301 or the autonomous vehicle, to determine an advanced deployment location for the autonomous vehicle within the assigned targeted location.

The determination of improved conditions at step 811 may include comparing measured conditions (at step 810) to a threshold (e.g., winds below about 30-40 miles per hour, rainfall less than about 0.25-0.5 inches per hour, etc.) or other known conditions. According to one embodiment, the autonomous vehicle 100 includes the weather station system 116 for making measurements of the conditions. The determination of improved conditions at step 811 may include receiving data from other autonomous vehicles deployed to adjacent (or nearby) targeted locations and combining the data into aggregated measured conditions, which may be compared to appropriate thresholds (e.g., to determine whether a current condition satisfies a threshold). In some examples, the determination that the condition satisfies the threshold is delayed to a time after a predicted event has occurred, for example, to avoid premature deployment of a secondary autonomous vehicle.

According to some embodiments, the determination of an acceptable location at step 812 may include comparing the advanced deployment location to the locations of members, for example, such that the locations of members are within the range of the secondary autonomous vehicles. In some cases, the autonomous vehicle may communicate with other autonomous vehicles and/or the fleet management controller 301 to determine appropriate coverage within an area affected by the event. In some cases, the detection of the members without service at step 816 maybe performed before the determination of the acceptable location at step 812.

According to some embodiments, the detection of member residences without service (step 815) may include sending internet polling requests to a plurality of members in the targeted location. The detection of member residences without service (step 815) may include accessing power outage maps including at least a portion of the targeted location to determine member residences without power. These and other methods may be used to detected member residences without service.

A secondary autonomous vehicle may be dispatched in anticipation of an event, during an event, or following an event. The dispatch of the secondary autonomous vehicle may be based on one or more probabilistic determinations related to, for example, the reachability of a member residence. For example, in a case where the event is predicted to be an ice storm, the dispatch of the secondary autonomous vehicle may be made in anticipation of the event, avoiding predicted conditions including useable roadways.

Figure 9:
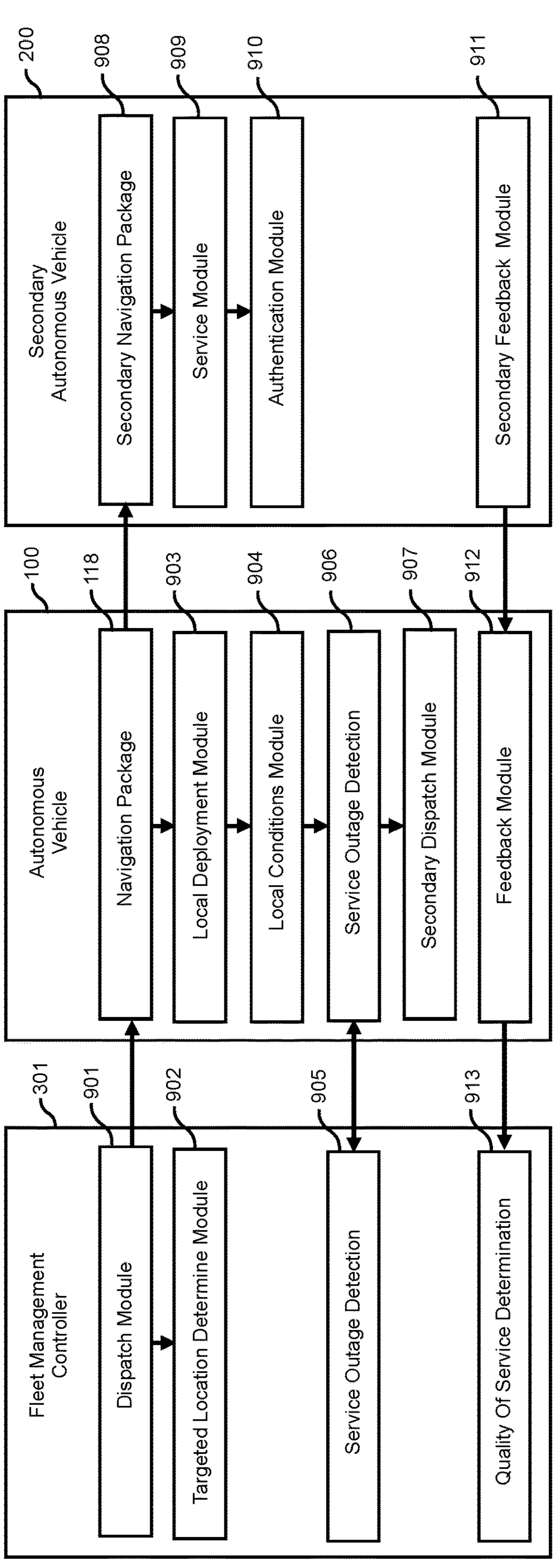
FIG. 9 is a connected logic hardware diagram illustrating a vehicle fleet dispatch process, in an embodiment.

FIG. 9 is a connected logic hardware diagram illustrating a vehicle fleet dispatch process, in an embodiment. According to some embodiments, the fleet management controller 301 includes a dispatch module 901 and a targeted location determination module 902. The dispatch module 901 of the fleet management controller 301 may determine a condition causing a dispatch of the autonomous vehicle 100 (see for example, FIG. 5, step 501 and step 504). The targeted location determination module 902 of the fleet management controller 301 may determine the targeted location to which the autonomous vehicle 100 is dispatched (see for example, FIG. 5, step 502 and step 503).

Dispatch data including a dispatch command and the targeted location are communicated to the navigation package 118 of the autonomous vehicle 100. The navigation package 118 of the autonomous vehicle 100 is used to navigate the autonomous vehicle 100 to the targeted location (see for example, FIG. 8, step 807). A local deployment module 903 of the autonomous vehicle 100 may determine the advanced deployment location within the targeted location (see for example, FIG. 8, step 806). The advanced deployment location may be determined given data collected by the different sensors of the autonomous vehicle 100 and may address changing conditions, such as road closures, real-time traffic, available parking structures, etc. (see for example, FIG. 8, step 808). A local conditions module 904 of the autonomous vehicle 100 may be used to collect data about the event to determine when conditions have improved (see for example, FIG. 8, step 811). One or more service outage detection modules (e.g., first service outage detection module 905 and second service outage detection module 906) may be used to collect data to detect member residences without service (see for example, FIG. 8, step 815).

A secondary dispatch module 907 may be used to instruct a secondary navigation package 908 of the secondary autonomous vehicle 200 to navigate to a member residence to render a service (see for example, FIG. 8, step 816). The secondary navigation package 908 may include obstacle detection sensors and navigation software for navigating to a member residence. A service module 909 of the secondary autonomous vehicle 200 may be used to render a service, meter a service, log service usage data, etc. According to some embodiments, the secondary autonomous vehicle may include an authentication module 910 configured to authenticate a member's credentials prior to providing the service, e.g., enabling power delivery or the communications package.

According to some embodiments, data about the service may be reported by a secondary feedback module 911 to a feedback module 912 of the autonomous vehicle 100 and/or a quality-of-service module 913 of the fleet management controller 301. Feedback data may be used by the autonomous vehicle 100 and/or the fleet management controller 301 to make decisions about further deployments, for example, by updating outage maps related to a service.

Figure 10:
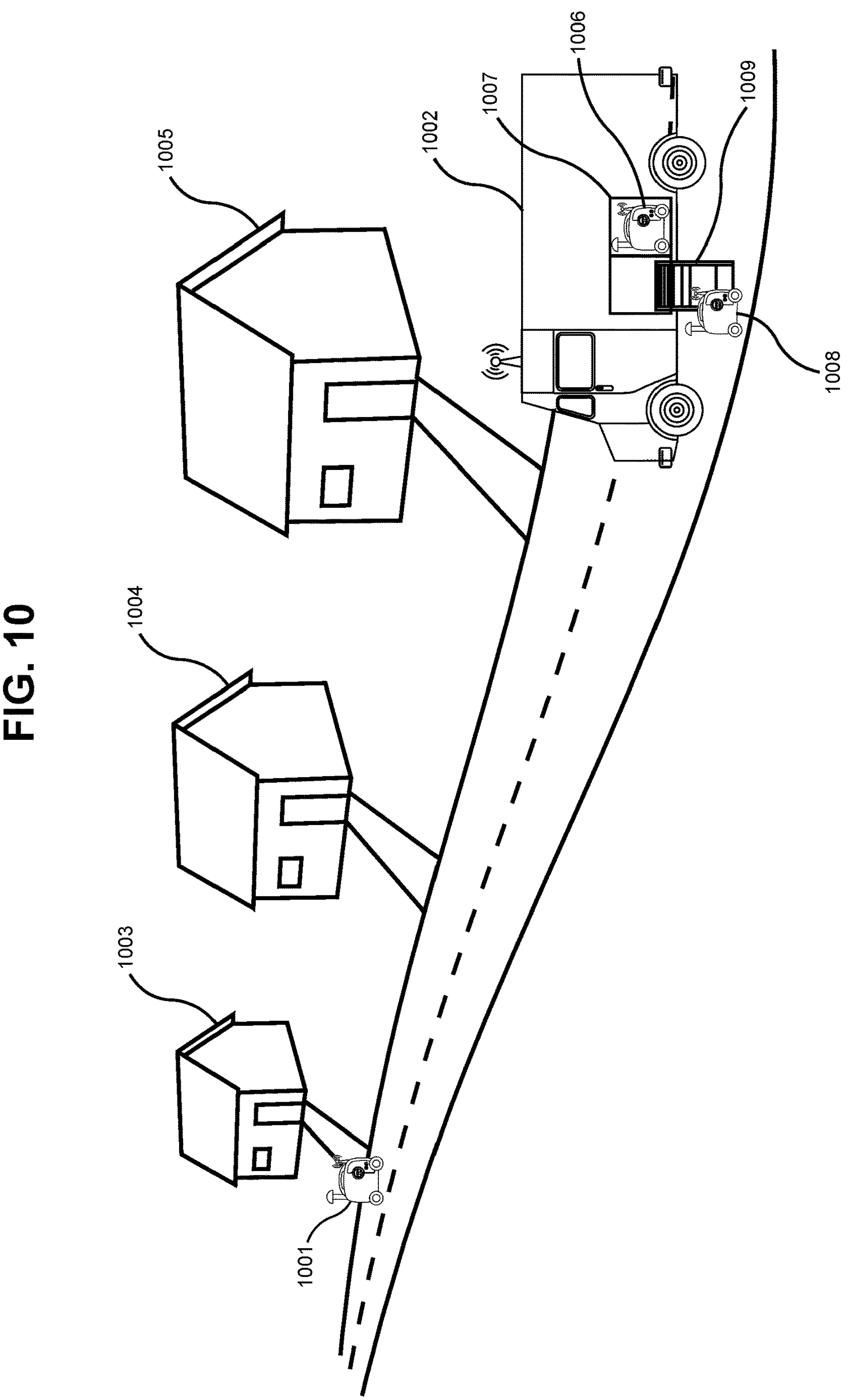
FIG. 10 is a schematic illustration of a deployment of secondary autonomous vehicle, in an embodiment.

FIG. 10 is a schematic illustration of a deployment of secondary autonomous vehicle, in an embodiment. As illustrated, a secondary autonomous vehicle 1001 deploys from an autonomous vehicle 1002. The area around the autonomous vehicle 1002 may include a first residence 1003 of a member without some service, a second residence 1004 of a member that has service, and a third residence 1005 of a non-member. In an example, the secondary autonomous vehicle 1001 navigates a street to the first residence 1003 of the member without service. In the example case, the secondary autonomous vehicle 1001 will not navigate to the second residence 1004 or the third residence 1005. The autonomous vehicle 1002 may include additional secondary autonomous vehicles 1006 and 1008 that may be housed in one or more garages 1007 and that may deploy using a ramp 1009. These additional secondary autonomous vehicles 1006 and 1008 may service additional residences needing service.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A method of deploying a service, the method comprising:

receiving, at a vehicle dispatch system, data about a predicted event;

determining, at the vehicle dispatch system, a density of persons in a service area predicted to be affected by the predicted event;

dividing, at the vehicle dispatch system, the service area into target locations based on the density of persons in the service area and a threshold number of persons to be served by a fleet of autonomous vehicles, the target locations including a targeted location and the fleet including an autonomous vehicle;

and dispatching, via a fleet management controller that includes a device processor and a non-transitory computer readable medium including instructions executable by the device processor, the autonomous vehicle to the targeted location before the predicted event, the autonomous vehicle including a garage that houses a number of secondary autonomous vehicles, wherein the threshold number is 2-4 times the number of secondary autonomous vehicles, and each secondary autonomous vehicle is configured to automatically travel between the autonomous vehicle and a residence of one of the persons in the target area.

2. The method of claim 1, wherein the data about the predicted event includes a predicted wind speed and a predicted wind direction.

3. The method of claim 1, wherein the data about the predicted event includes a predicted flood level.

4. The method of claim 1, further comprising providing the autonomous vehicle with a topography of at least a portion of the targeted location.

5. The method of claim 1, further comprising providing the autonomous vehicle with location data about a feature within the targeted location.

6. The method of claim 5, wherein the feature is a parking structure.

7. The method of claim 1, further comprising providing the autonomous vehicle with contact information for a device in a member premises and an address of the member premises, wherein the population is a population of members.

8. An autonomous fleet system including an autonomous vehicle, the system comprising a processor and machine-readable media including instructions which, when executed by the processor, cause the autonomous vehicle to:

receive, at a vehicle dispatch system, data about a predicted event;

determine, at the vehicle dispatch system, a density of persons in a service area predicted to be affected by the predicted event;

divide, at the vehicle dispatch system, the service area into target locations based on the density of persons in the service area and a threshold number of persons to be served by a fleet of autonomous vehicles, the target locations including a targeted location;

and dispatch, via a fleet management controller that includes a device processor and a non-transitory computer readable medium including instructions executable by the device processor, the autonomous vehicle to the targeted location before the predicted event, the autonomous vehicle including a garage that houses a number of secondary autonomous vehicles, wherein the threshold number is 2-4 times the number of secondary autonomous vehicles, and each secondary autonomous vehicle is configured to automatically travel between the autonomous vehicle and a residence of one of the persons in the target area.

9. The system of claim 8, wherein the data about the predicted event includes a predicted wind speed and a predicted wind direction.

10. The system of claim 8, wherein the data about the predicted event includes a predicted flood level.

11. The system of claim 8, further comprising providing the autonomous vehicle with a topography of at least a portion of the targeted location.

12. The system of claim 8, further comprising providing the autonomous vehicle with location data about a feature within the targeted location.

13. The system of claim 12, wherein the feature is a parking structure.

14. The system of claim 8, further comprising providing the autonomous vehicle with contact information for a device in a member premises and an address of the member premises, wherein the population is a population of members.

15. A non-transitory computer-readable medium storing software comprising instructions executable by one or more computers which, upon such execution, cause the one or more computers to control a system to deploy a service by performing the following:

receive, at a vehicle dispatch system, data about a predicted event;

determine, at the vehicle dispatch system, a density of persons in a service area predicted to be affected by the predicted event;

divide, at the vehicle dispatch system, the service area into target locations based on the density of persons in the service area and a threshold number of persons to be served by a fleet of autonomous vehicles, the target locations including a targeted location and the fleet including an autonomous vehicle;

and dispatch, via a fleet management controller that includes a device processor and a non-transitory computer readable medium including instructions executable by the device processor, the autonomous vehicle to the targeted location before the predicted event, the autonomous vehicle including a garage that houses a number of secondary autonomous vehicles, wherein the threshold number is 2-4 times the number of secondary autonomous vehicles, and each secondary autonomous vehicle is configured to automatically travel between the autonomous vehicle and a residence of one of the persons in the target area.

16. The non-transitory computer-readable medium storing software of claim 15, wherein the data about the predicted event includes a predicted wind speed and a predicted wind direction.

17. The non-transitory computer-readable medium storing software of claim 15, wherein the data about the predicted event includes a predicted flood level.

18. The non-transitory computer-readable medium storing software of claim 15, wherein the instructions further cause the one or more computers to provide the autonomous vehicle with a topography of at least a portion of the targeted location.

19. The non-transitory computer-readable medium storing software of claim 15, wherein the instructions further cause the one or more computers to provide the autonomous vehicle with location data about a feature within the targeted location.

20. The non-transitory computer-readable medium storing software of claim 15, wherein the instructions further cause the one or more computers to provide the autonomous vehicle with contact information for a device in a member premises and an address of the member premises, wherein the population is a population of members.

* * * * *